Patented Dec. 11, 1945

2,390,868

UNITED STATES PATENT OFFICE 2,390,868

PROCESS FOR REMOVING COPPER COMPOUNDS FROM COPPER-SWEETENED HYDROCARBON OIL

Kenneth M. Brown, Chicago, Ill., assignor to Universal Oil Products Company, Chicago, Ill., a corporation of Delaware No Drawing. Application July 24, 1943,
Serial No. 496,043

6 Claims. (Cl. 196—30)

This invention relates to the treatment of hydrocarbon oil for the removal of metal compounds and other undesirable dissolved constituents, and more particularly it relates to the treatment of copper-sweetened gasoline and naphtha for the removal of copper compounds and other undesirable constituents.

One of the methods now in use for refining hydrocarbon oil and particularly gasoline and naphtha in order to remove deleterious sulfur compounds, is the copper sweetening method as is illustrated in R. B. Day Patent 1,948,565. Various sweetening processes have been suggested in which other metal salts such as copper chloride, zinc salts and particularly zinc chloride, etc., are utilized.

In the copper sweetening process, it has been found that the gasoline after sweetening contains copper compounds and possibly other undesirable dissolved constituents and that these compounds exert an undesirable color effect to the gasoline. It is an object of the present invention to treat the sweetened gasoline in a novel manner in order to remove the copper compounds and other undesirable constituents from the gasoline.

In a broad aspect the present invention relates to the treatment of hydrocarbon oil for the removal of metal compounds which comprises contacting said oil with a basic or sub-carbonate of the elements in the right-hand column of group II of the periodic table.

In one specific embodiment the present invention relates to a process for the removal of copper compounds from copper-sweetened gasoline which comprises treating said gasoline with basic magnesium carbonate.

According to the present invention, the copper-sweetened gasoline is percolated or otherwise contacted with a treating agent comprising as its active constituent a basic or sub-carbonate of the elements in the right-hand column of group II of the periodic table. The preferred treating agent comprises basic magnesium carbonate.

The chemical formula of the basic or sub-carbonates of these elements has been fairly well established although there seems to be a slight disagreement among the various authors in certain instances. However, the following formulae are listed as representing their approximate chemical composition:

Magnesium basic carbonate $$3MgCO_3 \cdot Mg(OH)_2 \cdot 3H_2O$$

Zinc sub-carbonate $$2ZnCO_3 \cdot 3Zn(OH)_2$$

Beryllium basic carbonate $$(BeO)_5CO_2 \cdot 5H_2O$$

Mercury basic carbonate $$HgCO_3 \cdot 2HgO$$

Although the existence of a basic carbonate of cadmium has been definitely established, its exact chemical formula has apparently not been accurately determined.

It is understood that these various treating agents are not necessarily equivalent in effecting removal of metal compounds and other undesirable constituents from hydrocarbon oil.

The treating agent of the present invention is preferably utilized in the form of a bed of granular solid contact material although the invention is not limited to this. Contacting may be carried out using powders, slurries and the like. The basic or sub-carbonates of the present invention may be produced by precipitation or by other well known methods and the carbonates may then be mixed with or distributed over the surface of relatively inert spacing materials or carriers such as fuller's earth, bentonite clays, ground pumice, etc., in order to give better distribution and a greater surface of contact.

The operation of the process is extremely simple and consists merely in passing the copper-sweetened gasoline through a bed of granular material containing the basic or sub-carbonate at atmospheric or slightly increased temperatures, using pressure, if desired, to maintain substantially liquid phase conditions. Although atmospheric temperature is usually used, moderately elevated temperatures may be employed, for example up to about 150° F.

It has been found beneficial in certain cases to add a small but definite amount of moisture. It is believed that the moisture serves to maintain the activity of the treating agent.

The following examples are introduced for the purpose of further illustrating the present invention, but not with the intention of unduly limiting the same.

EXAMPLE I

A naphtha was percolated at atmospheric temperature through a contact mass comprising cupric sulfate and ammonium chloride mixed with pumice under conditions to dissolve a high content of copper in the naphtha. According to this procedure the naphtha had a copper content of 2.76 milligrams per liter.

The copper-containing naphtha was separated into various portions, each portion then being contacted with a separate treating agent comprising various percentages of basic magnesium carbonate admixed with pumice, with and without the addition of water, to give the following results:

Table

| | Experiments | | | |
|---|---|---|---|---|
| | 1 | 2 | 3 | 4 |
| Treating agent | 5% basic magnesium carbonate on 95% pumice. | 11% basic magnesium carbonate on 89% pumice. | 5% basic magnesium carbonate on 95% pumice + 2 cc. of water. | 20.7% basic magnesium carbonate on 79.3% pumice + 4 cc. of water. |
| Amount of reagent employed, in grams. | 15 | 15 | 30 | 30 |
| Copper content of the first 400 cc. of treated naphtha, Mg/L. | 1.69 | 1.62 | 1.35 | 1.42 |

The data reported above are from laboratory experiments and it is to be noted that there is a considerable decrease in the copper content by treatment in accordance with the present invention. In commercial operations employing large volumes of the treating agent, the reduction in copper will be materially increased.

Example II

A few drops of copper oleate in a kerosene solution were added to 30 cc. of copper-sweetened naphtha. The mixture was slightly blue in color. The naphtha was then passed through a tower packed with a mixture comprising pumice and 50% by volume of basic magnesium carbonate at atmospheric temperature. After such treatment the naphtha was colorless and substantially copper-free.

I claim as my invention:

1. A process for removing copper compounds from copper-sweetened hydrocarbon oil which comprises treating said oil with basic magnesium carbonate in solid form.

2. A process for removing copper compounds from copper-sweetened hydrocarbon oil which comprises percolating said oil through a bed of solid material comprising basic magnesium carbonate.

3. A process for removing copper compounds from copper-sweetened hydrocarbon oil which comprises treating said oil with basic magnesium carbonate in solid form and in the presence of a small but effective amount of water.

4. A process for removing copper compounds from copper-sweetened hydrocarbon oil which comprises treating said oil with a solid magnesium compound having the formula $$3MgCO_3 \cdot Mg(OH)_2 \cdot 3H_2O$$

5. A process for removing copper compounds from copper-sweetened hydrocarbon oil which comprises percolating said oil through a bed of solid material comprising a solid magnesium compound having the formula $$3MgCO_3 \cdot Mg(OH)_2 \cdot 3H_2O$$

6. The process as defined in claim 5 further characterized in that said bed comprises a solid carrier for the magnesium compound.

KENNETH M. BROWN.